March 31, 1959 A. ZUBAL ET AL 2,879,918
LEAD LOADING ARRANGEMENT
Filed June 18, 1954 3 Sheets-Sheet 1
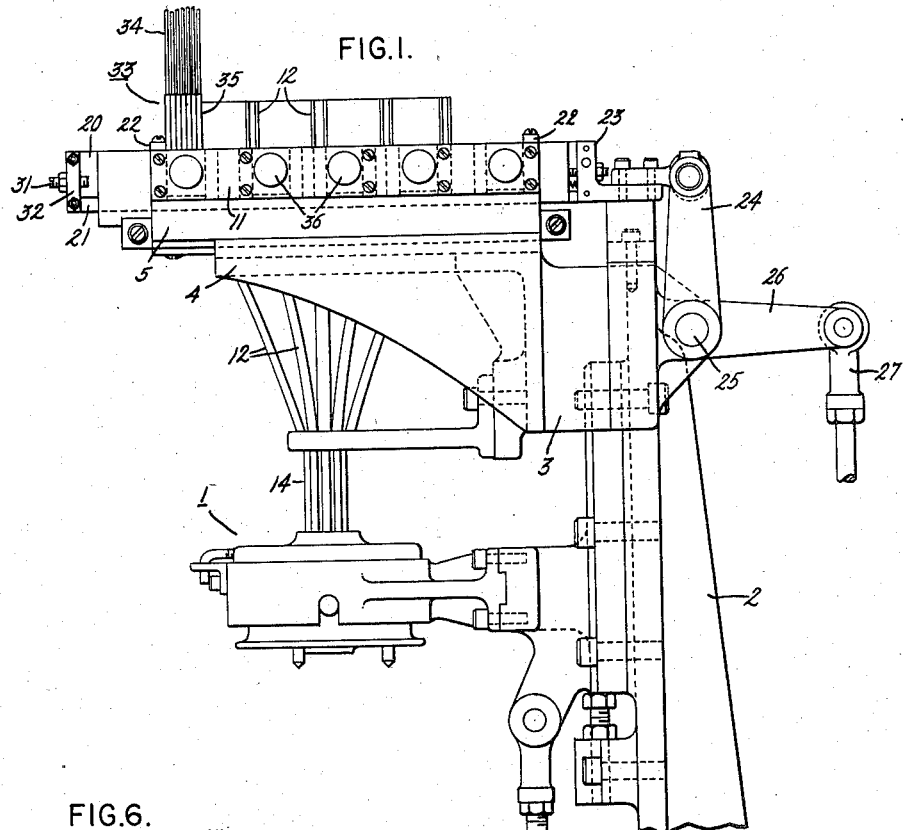
FIG.I.
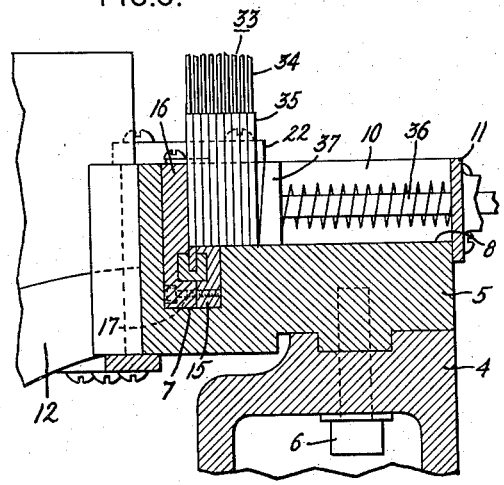
FIG.6.
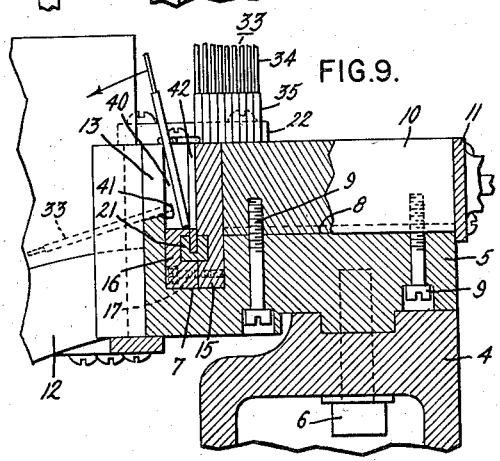
FIG.9.
INVENTORS:
ANTHONY ZUBAL,
ARTHUR BOUVIER,
BY *Nathan Kompfer*
THEIR ATTORNEY.

March 31, 1959 A. ZUBAL ET AL 2,879,918
LEAD LOADING ARRANGEMENT
Filed June 18, 1954 3 Sheets-Sheet 2
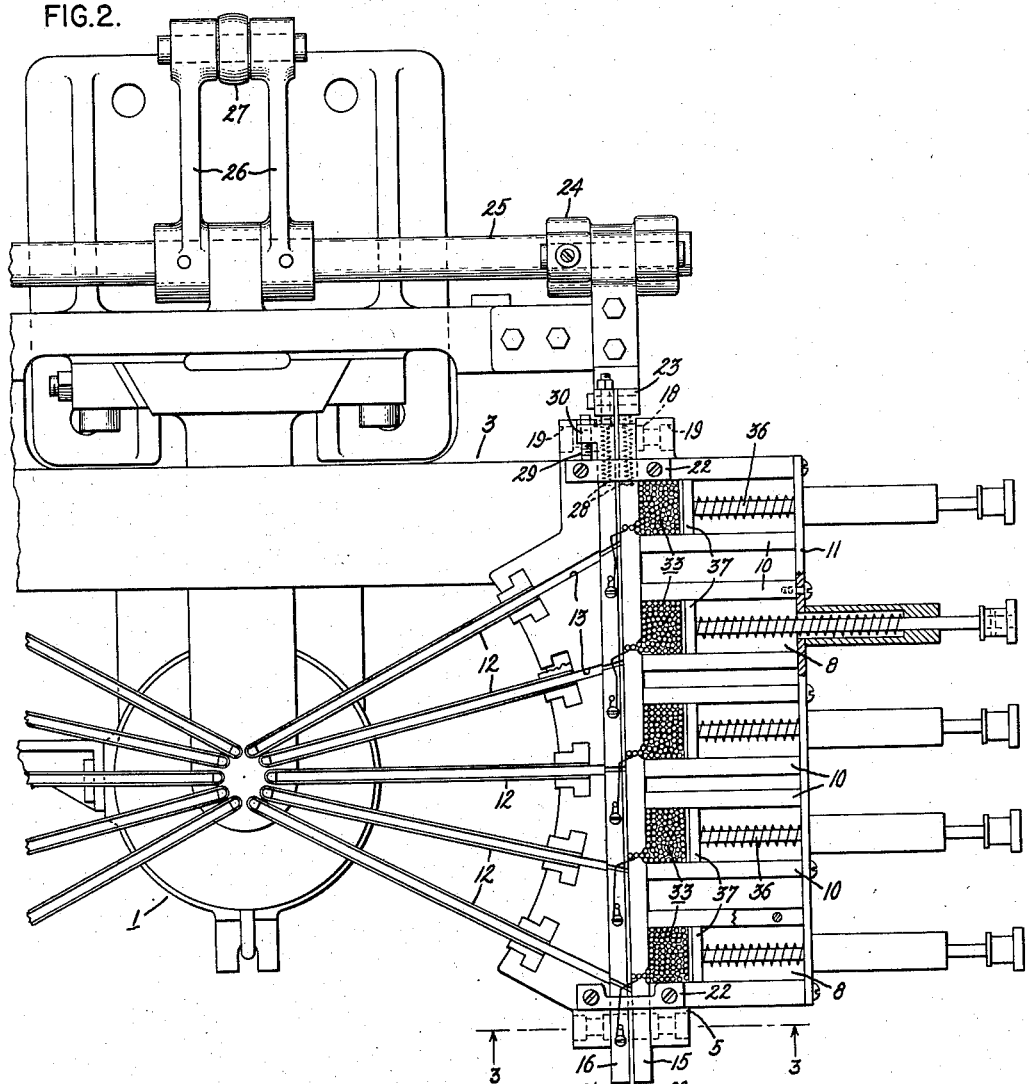
FIG.2.
FIG.3.
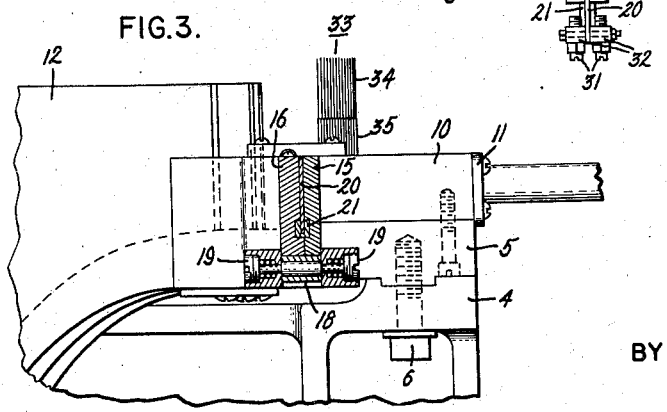
INVENTORS:
ANTHONY ZUBAL,
ARTHUR BOUVIER,
BY *Nathan Kornfeld*
THEIR ATTORNEY.

March 31, 1959 A. ZUBAL ET AL 2,879,918
LEAD LOADING ARRANGEMENT
Filed June 18, 1954 3 Sheets-Sheet 3
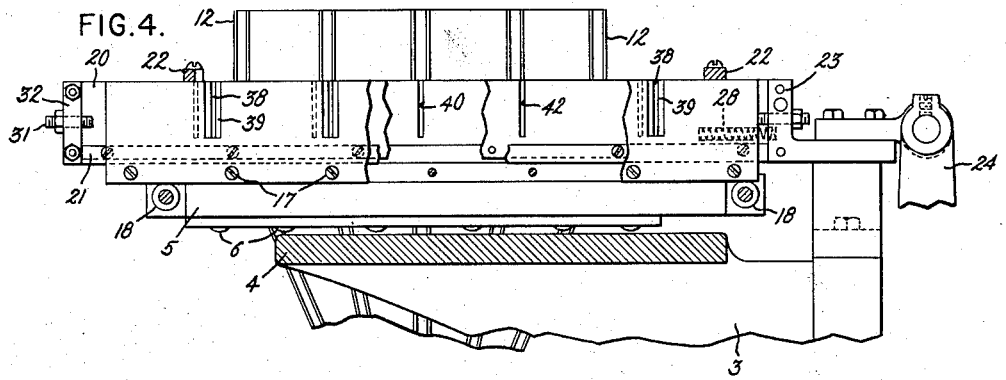
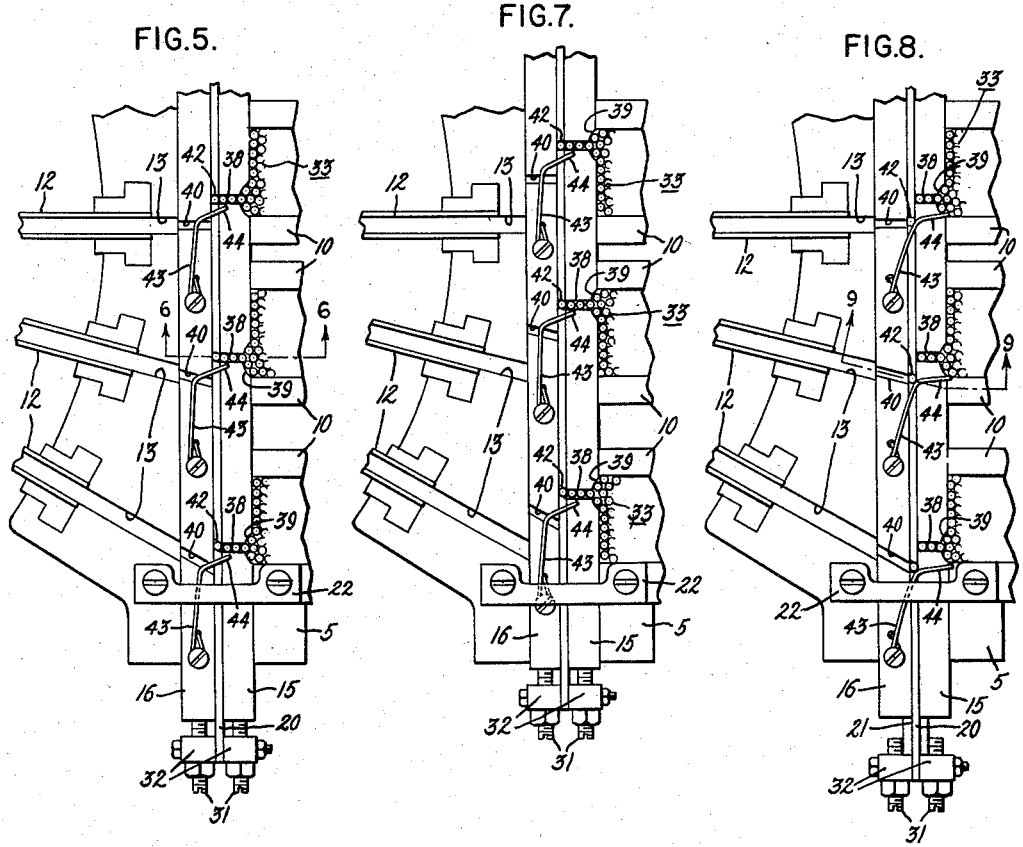
INVENTORS:
ANTHONY ZUBAL,
ARTHUR BOUVIER,
BY Nathan J Cornfeld
THEIR ATTORNEY.

United States Patent Office 2,879,918
Patented Mar. 31, 1959

2,879,918

LEAD LOADING ARRANGEMENT

Anthony Zubal, Watervliet, and Arthur Bouvier, Gloversville, N.Y., assignors to General Electric Company, a corporation of New York Application June 18, 1954, Serial No. 437,838

6 Claims. (Cl. 221—236)

Our invention relates to electronic tube manufacturing equipment and pertains more particularly to a new and improved automatic arrangement for loading tube leads into equipment for manufacturing electronic tube stems.

In manufacturing some electronic tube stems, such as those used in cathode ray tubes, the leads are formed to include portions of different diameters or thicknesses. These leads are usually formed by butt welding wire sections of different diameters. Owing to the difference in diameters of the wire sections and weld knots generally resulting at the butt welds, the leads are difficult to load automatically and in a predetermined manner in the stem manufacturing equipmnt. Accordingly, the primary object of our invention is to provide new and improved lead loading means.

Another object of our invention is to provide new and improved means for loading leads in tube manufacturing equipment in a predetermined manner.

Another object of our invention is to provide new and improved means for loading leads comprising sections of different diameters into tube manufacturing equipment with the thinner ends first.

Another object of our invention is to provide new and improved means for loading tube leads comprising butt welded wire sections into tube manufacturing equipment in such a manner as to be unaffected by weld knots at the butt welds.

Still another object of our invention is to provide new and improved lead loading means for automatically loading tube leads comprising butt welded sections of different diameters into tube manufacturing equipment, the thinner ends first, and from magazines in which the leads are held by the large ends thereof.

Further objects and advantages of our invention will become apparent as the following description proceeds and the features of novelty which characterize our invention will be pointed out with particularity in the claims annexed to and forming part of this specification.

In carrying out the objects of our invention, we provile a pair of spaced bars fixedly disposed relative to each other and formed to include offset vertical slots. The bars are arranged to be actuated so that one thereof slides past an open end of a lead magazine. The magazine is adapted for holding a sheaf of leads by the thicker ends thereof and biasing the leads into engagement with the one bar whereby a lead is lodged in the slot therein. A slide member including a vertical slot is arranged to be actuated between and relative to the spaced bar. The slot in this member receives the lead from the slot in the one bar and actuates it toward the offset slot in the other bar. In moving toward the offset slot the lead engages and depresses a resilient member disposed substantially above the lower end of the lead. Upon arrival of the lead at the offset slot, the resilient member impells the lead thinner end first through the offset slot into a guide chute.

For a better understanding of our invention, reference may be had to the accompanying drawing in which:

Fig. 1 is a side elevation view illustrating our invention;

Fig. 2 is an enlarged fragmentary plan view further illustrating our invention;

Fig. 3 is an enlarged fragmentary sectional view taken along the line 3—3 in Fig. 2;

Fig. 4 is an enlarged fragmentary side elevation view partially broken away to illustrate the slide bar arrangement in detail;

Fig. 5 is an enlarged fragmentary plan view illustrating one operational position of the device;

Fig. 6 is a fragmentary sectional view taken along the line 6—6 in Fig. 5;

Fig. 7 is another enlarged fragmentary plan view illustrating another operational position of the device;

Fig. 8 is still another enlarged fragmentary plan view illustrating still another operational position of the device; and Fig. 9 is a fragmentary sectional view taken along the line 9—9 in Fig. 8.

Referring to Figs. 1 and 2, we have shown our invention applied to equipment adapted for simultaneously loading a plurality of tube leads in a circular array in a stem mold generally designated 1. The mold 1 does not comprise part of the present invention and accordingly will not be described in detail; suffice it to say that the mold 1 is suitably secured on the lower portion of a support frame 2 and is adapted for receiving the leads for forming a vitreous stem thereabout.

Securely mounted on the upper portion of the frame 2 is a support head generally designated 3 and formed to include a spaced pair of forwardly extending arms generally designated 4. The arms 4 are adapted for supporting lead magazines and dispensing means which comprise part of our invention and will be described in detail hereinafter.

As perhaps best seen in Fig. 2, the equipment to which our invention is applied is symmetrical in construction in order to facilitate the loading of the stems in the circular array in the mold. Therefore, it will be adequate for an understanding of our invention to limit the description thereof to the right hand half shown in full in Fig. 2, which half of the structure is adapted for loading in the mold one-half of the number of leads to be loaded at any one time. It will be understood that the left hand half will be substantially identical but in reverse and will be effective for loading the other half of the number of leads to be loaded into the mold.

As seen in Figs. 1 to 4, an elongated substantially rectangular block 5 is provided and secured as by a plurality of machine screws 6 to the upper surface of the right hand support arm 4. Now as seen in Fig. 6, the block 5 is machined to include a longitudinally extending groove or channel 7 and a longitudinally extending flat upper surface portion 8. Suitably mounted on the upper surface 8 of the block 5 at the front and rear edges and at predetermined spaced intervals therebetween by means of machine screws 9 shown in Fig. 9, is a plurality of vertical bars or wall members 10. Suitably mounted across the outer edges of the wall members 10 is an elongated side wall member or bar 11. The bars 10 and 11 cooperate to form a plurality of lead magazines which will be described in more detail hereinafter.

The block 5 is adapted for supporting in any suitable manner chute members 12 leading from guide slots 13 in the block 5 to tubular guide members 14 extending into the mold 1. Inasmuch as the guide members 14 are arranged in a circular array, the chutes 12 and the slots 13 extend radially toward the magazines from which the leads will be dispensed in a manner to be described hereinafter.

The elongated groove 7 in the block 5 is adapted for receiving bars 15 and 16. The bars 15 and 16 are fastened together at their lower edges by screws 17 clearly shown in Figs. 4 and 6 and are adapted for sliding movement in the groove 7 formed in the block 5 and on rollers 18 fitted on the inner ends of bolts 19 suitably threaded into the forward and rear end portions of the bars 15 and 16.

The inner surfaces of the bars 15 and 16 are formed to provide a space between the upper portions thereof for receiving a slide bar or member 20. The inner surfaces of the bars 15 and 16 are further formed for receiving in a slidable manner a bar 21 which is wider than the slide bar 20 and secured to the lower edge thereof for retaining the bar 20 between the bars 15 and 16.

In the arrangement described to this point the bars 15 and 16 are secured together and are retained in the groove 7 in the block 5 by cross members 22 at the forward and rear inner end portions of the block and the front and rear end ones of the magazine walls 10. Thus the bar 15 is arranged for being slidable past the inner and open ends of the lead magazines. Additionally, the bar 20 is slidably movable in the space between the bars 15 and 16 and relative thereto.

The rear end of the bar 20 is secured to a member 23 which is pivotally connected between a spaced pair of levers 24 suitably held fast on one end of a rock shaft 25 which in turn is suitably journaled in the frame 3. Secured on the center portion of the rock shaft 25 is another spaced pair of levers 26 between the ends of which is pivotally connected an actuating rod 27. By means not shown, the rod 27 is adapted for being vertically actuated and returned a predetermined distance thereby to rock the shaft 25 for reciprocating the slide bar 20 a predetermined distance.

For a purpose which will be brought out in more detail hereinafter, the described reciprocation of the slide bar 20 is effective both for actuating the slide bar 20 relative to the bars 15 and 16 between which it is slidably arranged and for reciprocating the bars 15 and 16 relative to the magazines and the chutes. The bars 15 and 16 are biased forward relative to the bar 20 by means of a pair of coil springs 28 shown in Figs. 2 and 4. The coil springs 28 are seated in suitable bores provided in the rear extremities of the bars 15 and 16 and extend therefrom to engage the member 23. Thus, through the agency of the springs 28 forward reciprocation of the member 23, as effected by rocking of the shaft 25, first causes forward actuation of the bars 15 and 16 and the slide bar 20 together. The forward movement of the bars 15 and 16 is limited by a set screw 29 threaded in an extension 30 formed on the side of the bar 16 and adapted for engaging the rear side of the block 5, in the manner shown in Fig. 2. Thereafter, continued forward actuation of the slide bar 20 causes compression of the springs 28 and forward movement of the slide bar 20 relative to the bars 15 and 16. During the return movement of the slide bar 20, the springs 28 retain the bars 15 and 16 in their forward positions until set screws 31 in threaded members 32 secured to either side of the forward end of the slide bar 20 abut the forward ends of the bars 15 and 16 to cause them to be returned by further rearward movement of the bar 20. It will be seen that in the just-described arrangement, relative longitudinal positioning of the bars 15 and 16 and the bar 20, the rearwardmost or forwardmost positions and the extent of relative movement between the bars may be adjusted by means of the set screws 29 and 31.

The above-referred-to magazines are adapted for receiving and holding the leads to be dispensed into the chutes 12. The leads generally designated 33 in Figs. 5–9 comprise thin sections 34 and thicker sections 35 suitably butt welded together. The magazines are adapted for receiving the thicker ends 35 of the leads 33 and biasing the leads toward and into engagement with the outer surface of the bar 15. To accomplish this, there is provided in each of the magazines a spring biased plunger 36 to which is secured a movable wall 37. The movable walls 37 are biased into engagement with the thicker ends 35 of the leads 33 disposed in the magazines for urging them into contact with the bar 15.

As best seen in Figs. 2 and 4, the bar 15 is formed to include a plurality of equally spaced vertical slots or lead passages 38 corresponding in number to the number of magazines. The spacing of the slots 38 is such that the slots are each in communication with its corresponding magazine throughout the sliding movement of the bar 15. The slots 38 extend downwardly to the surface 8 of the block 5, which constitutes the floor of the magazines, and are slightly wider than the thicker ends 35 of the leads 33 thereby to permit seriatim lateral passage of vertically extending leads through the slots. Additionally, as seen in Fig. 5 the surface portions of the bar 15 at the edges of the slots 38 are machined out at 39 to provide for funneling or guiding the leads into the slots from the magazines.

The bar 16 is formed with a plurality of vertical slots or lead passages 40 which are offset relative to the slots 38. The slots 40 are adapted each for being aligned or registering with a respective one of the radially extending guide slots or passages 13 formed in the block 5 when the bars 15 or 16 are in the forwardmost positions thereof mentioned above. Additionally, the slots 40 are each cut at an angle corresponding with its related guide slot 13. As seen in Fig. 9, the slots 13 do not extend downwardly as far as the slots 38 and 40 in order to provide a step 41, the purpose for which will be made clear hereinafter.

As best seen in Figs. 4 and 5 through 9 the slide bar 20 is formed to include a plurality of spaced vertical slots or lead passages 42. These slots are similar to the slots 38 and 40 and correspond in spacing. The slots 42 are also just slightly wider than the thick ends 35 of the leads 33. Additionally, the slide 20 itself is just slightly thicker than the portions 35 of the leads. Thus it will be seen that the slots 42 are each such as to be capable of receiving one lead at a time from its corresponding slot 38 in the bar 15.

Upon rearward movement of the bars 15 and 16 and the slide 20, following engagement of the set screws 31 with the forward ends of the bars 15 and 16, the slots 38 and 42 travel from the positions of Fig. 5 to the positions thereof shown in Fig. 7 wherein the slots 38 and 42 are in register. Additionally, the movement causes several leads to move into each of the slots 38 in the bar 15 and one lead to be positioned in each of the slots 42 in the slide bar 20 in the manner shown in Fig. 6. During subsequent forward movement, the bars 15 and 16 and the slide bar 20 are returned toward the position of Fig. 5. Thereafter the adjusting screw 29 carried by the bar 16 engages the rear end of the block 5 whereby the forward movement of the bars 15 and 16 is limited at the positions thereof in Fig. 5 and the slide bar 20 is caused to move forward relative thereto to the position thereof shown in Fig. 8. Thus the slots 42 in the slide bar 20 are moved into register with those in the bar 16, which in turn are in register with the guide slots 13 in the block 5 whereby the leads positioned in the slots 42 in the slide bar 20 are rendered free to move through the slots 40 in the bar 16 into the guide slots 13 in the block 5 for falling into the chutes 12 and being thereby fed into the guide tubes 14 for positioning in the mold 1.

Now, as pointed above and clearly seen in Figs. 1, 3, 6 and 9, the leads 33 are loaded in the magazines with the thicker sections 35 thereof extending downward in the magazines. The leads are loaded in the magazines in this manner in preference to having the thinner sections in the magazine owing to the fact that if a sheaf of the leads 33 are held by the thinner sections, the thicker ends would be bent out of vertical alignment, would become entangled and would be generally difficult to handle automatically. Additionally, these undesirable conditions would be aggravated by any weld knots at the butt welds between the section of the leads.

In loading the leads into the mold 1, however, it is desirable that they be loaded the thinner sections 34 first or downward; thus the leads must be somehow inverted during their travel from the magazines to the mold. This we accomplish by the provision of a plurality of resilient members 43. As seen in Figs. 2, 5, 7 and 8, the members 43 may comprise lengths of resilient wire. Each member 43 is secured at one end to the bar 16 and the free end is bent to form a cam portion 44 adapted for extending over the upper edge of the slide bar 20.

During the forward movement of the slide bar 20 relative to the bars 15 and 16 in the manner shown in Fig. 8, the leads disposed in the slots 42 in the slide bar engage and deflect the resilient members forwardly whereby energy is stored therein. Subsequently, when the slots 42 are in full register with the slots 40 in the bar 16, at which time the slots 40 are in register with the guide slots 13, the resilient members are no longer restrained and are released or operatively moved or actuated for impelling the leads through the slots 40 and 13. The resilient members 43 are disposed a substantial distance above the lower ends of the leads, or, in other words, the resilient members are engaged by intermediate portions of the leads. Thus, when the leads are impelled through the slots 40 they move therethrough, upper end first and are thereby inverted in the manner shown in Fig. 9. Additionally, as seen in Fig. 9, the slots 13 in the block 5 do not extend downwardly to the same extent as the other slots whereby the steps 41 are provided; thus as the leads 33 are impelled through the slots 40, the lower ends thereof are tripped by the steps 41 thereby to assist in inverting the leads as they move through the guide slots 13 into the chutes 12, for delivery thinner end first to the mold 1.

It will be seen that while individual resilient members 43 are shown, other equally effective means can be alternatively employed. For instance, a single inwardly biased member having a plurality of suitable cam surfaces for cooperation with the leads can be utilized in place of the wires.

While we have shown and described a specific embodiment of our invention, we do not desire our invention to be limited to the particular form shown and described, and we intend by the appended claims to cover all modifications within the spirit and scope of our invention.

What we claim as new and desire to secure by Letters Patent of the United States is:

1. In a lead loading arrangement, a spaced pair of members each including an elongated lead passage offset with respect to the other, a slide member arranged for movement between said spaced members, said slide member including an elongated lead passage adapted for holding an individual lead, means for actuating said slide member to move said passage therein into successive register with the offset passages in said spaced members, said slide member being adapted to move a lead received in said passage therein from the passage in one of said spaced members to the passage in said other of said spaced members, and resilient means adapted for being deflected by said lead during movement thereof by said slide member, said resilient means being operative for impelling said lead one end first through said passage in said other of said spaced members upon register therewith of said passage in said slide member.

2. In a lead loading arrangement, a spaced pair of members each including an elongated vertical lead passage offset with respect to the other, a slide member arranged for movement between said spaced members, said slide member including an elongated vertical lead passage adapted for holding an individual lead, means for actuating said slide member to move said passage therein into successive register with said passages with the offset passages in said spaced members, said slide member being adapted to move a lead received in said passage therein from the passage in one of said spaced members to the passage in the other of said spaced members, resilient means adapted for being engaged by an intermediate portion of said lead and deflected thereby during movement of said lead, said resilient means being operative for impelling said lead upper end first through said passage in said other of said spaced members upon register therewith of said passage in said slide member thereby to invert said lead, and means for tripping the lower end of said lead during movement thereof through said passage in said other of said spaced members thereby to assist in inverting said lead.

3. In a lead loading arrangement, a spaced pair of members each including an elongated lead passage offset with respect to the other, means for biasing a sheaf of leads into engagement with the outer side of one of said spaced members, means for actuating said one of said spaced members to effect movement of leads from said sheaf into said passage therein, a slide member arranged for movement between said spaced members, said slide member including an elongated lead passage adapted for holding an individual lead, means for actuating said slide member to move said passage therein into successive register with the offset passages in said spaced members, said passage in said slide member being adapted to receive a lead from said passage in said one of said spaced members for moving said lead toward said passage in the other of said spaced members, and resilient means adapted for being deflected by said lead during movement thereof toward said passage in said other of said spaced members, said resilient member being operative for impelling said lead through said passage in said other of said spaced members one end first when said passages in said slide member and said other spaced member are in register.

4. In a lead loading arrangement, a spaced pair of members each including an elongated vertical lead passage offset with respect to the other, means for biasing a vertical sheaf of leads into engagement with the outer side of one of said spaced members, means for actuating said one of said spaced members to effect movement of leads from said sheaf into said passage therein, a slide member arranged for movement between said spaced members, said slide member including an elongated vertical passage adapted for holding an individual lead, means for actuating said slide member to move said passage therein into successive register with the offset passages in said spaced members, said passage in said slide member being adapted to receive a lead from said passage in said one of said spaced members for moving said lead toward said passage in the other of said spaced members, resilient means adapted for being engaged by an intermediate portion of said lead and being deflected by said lead during movement thereof toward said passage in said other of said spaced members, said resilient member being operative for impelling said lead upper end first through said passage in said other of said spaced members when said passages in said slide member and said other spaced member are in register thereby to invert said lead, and means for tripping the lower end of said lead during movement thereof through said passage in said other spaced member thereby to assist in inverting said lead.

5. In a lead loading arrangement, a first member including a plurality of spaced, vertical open-ended slots defining lead passages, said passages extending at predetermined angles for directing leads passing therethrough toward a generally common point, a second member in sliding lateral engagement with said first member and including similar slots, said slots in said second member being adapted for moving a plurality of leads into effective vertical positions for lateral movement through said slots in said first member, and resilient means adapted for being depressed by said leads during movement thereof into said effective position by said second member, said resilient means being released by said leads when said leads are effectively positioned, and thereby rendered operative for impelling said leads through said slots in said first member one end first, whereby said leads are transferred in an inverted manner toward said common point.

6. In a lead loading arrangement, a spaced pair of members, one of said members including a plurality of vertical, open-ended slots defining lead passages and extending at predetermined angles for directing leads passing therethrough toward a generally common point, the other of said members including a plurality of similar slots located in offset positions relative to said slots in said one member, means for biasing a plurality of sheaves of leads into engagement with the outer side of said other member, means for actuating said other member to effect movement of leads from said sheaves into said slots therein, a slidable member between said spaced members including a plurality of vertical, open-ended slots each adapted for holding an individual lead, means for actuating said slidable member to move said slots therein into successive register with the offset slots in said spaced members, said slidable member being adapted to receive leads from said slots in said other member for moving said leads into effective vertical positions for lateral passage through said slots in said one member, and resilient means adapted for being depressed by said leads during movement toward said effective positions, said resilient means being released by said leads and thereby rendered operative for impelling said leads one end first through said slots in said first member when said leads are effectively positioned, whereby said leads are transferred in an inverted manner toward said common point.

References Cited in the file of this patent

UNITED STATES PATENTS

| | | |
|---|---|---|
| 986,777 | Standish | Mar. 14, 1911 |
| 1,316,932 | Vaughn | Sept. 23, 1919 |
| 2,110,923 | Taylor | Mar. 15, 1938 |
| 2,186,841 | Rylander | Jan. 9, 1940 |
| 2,252,561 | Engel | Aug. 12, 1941 |
| 2,303,005 | Swangren | Nov. 24, 1942 |
| 2,322,551 | Stull | June 22, 1943 |